United States Patent [19]
Cassone

[11] Patent Number: 4,986,218
[45] Date of Patent: Jan. 22, 1991

[54] CANINE LAVATORY

[76] Inventor: Rudolph Cassone, 292 Bay 11th St., Brooklyn, N.Y. 11228

[21] Appl. No.: 421,665

[22] Filed: Oct. 16, 1989

[51] Int. Cl.[5] ............................................. A01K 29/00
[52] U.S. Cl. ................................................... 119/169
[58] Field of Search ............................................. 119/1

[56] References Cited

U.S. PATENT DOCUMENTS

| | | | |
|---|---|---|---|
| 4,181,096 | 1/1980 | Grubman | 119/1 |
| 4,715,320 | 12/1987 | Barnhart | 119/1 |
| 4,836,141 | 6/1989 | Whitfield | 119/1 |
| 4,892,058 | 1/1980 | Clark | 119/1 |

FOREIGN PATENT DOCUMENTS 2599585 12/1987 France ........................ 119/1

Primary Examiner—John Weiss
Attorney, Agent, or Firm—Richard L. Miller

[57] ABSTRACT

A canine lavatory is provided and consists of a base member and a collector that will catch excrement from a dog so that the excrement can be collected and removed from the base member for disposal. A deflector can be removably attached to the base member to direct urine fom a male dog into the collector so that the urine can be collected and removed from the base member for disposal.

3 Claims, 1 Drawing Sheet

CANINE LAVATORY

BACKGROUND OF THE INVENTION

The instant invention relates generally to animal toilets and more specifically it relates to a canine lavatory.

Numerous animal toilets have been provided in the prior art that are adapted to receive waste products from animals. For example, U.S. Pat. Nos. 3,964,437 to Brown; 4,117,555 to Dennis and 4,185,861 to Berner all are illustrative of such prior art. While these units may be suitable for the particular purpose to which they address, they would not be as suitable for the purpose of the present invention as hereafter described.

SUMMARY OF THE INVENTION

A primary object of the present invention is to provide a canine lavatory that will overcome the shortcomings of the prior art devices.

Another object is to provide a canine lavatory that will catch excrement from a dog so that the excrement can be collected and removed from the lavatory for disposal.

An additional object is to provide a canine lavatory that includes a deflector to direct urine from a male dog into the lavatory so that the urine can be collected and removed from the lavatory for disposal.

A further object is to provide a canine lavatory that is simple and easy to use.

A still further object is to provide a canine lavatory that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
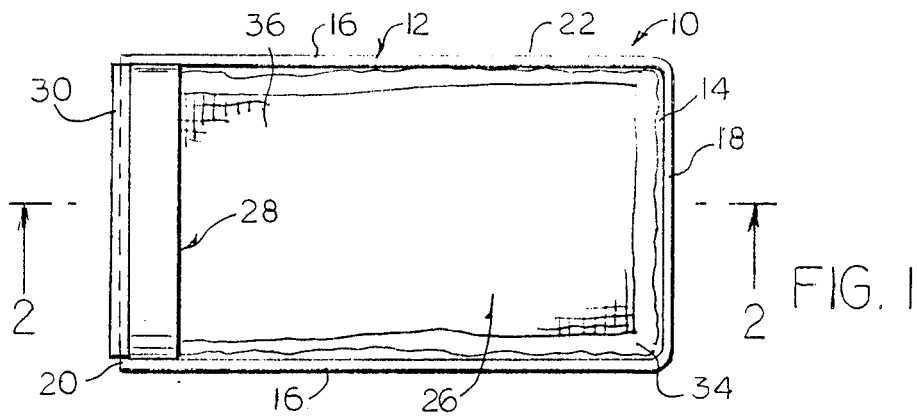
FIG. 1 is a top view of the instant invention.
Figure 2:
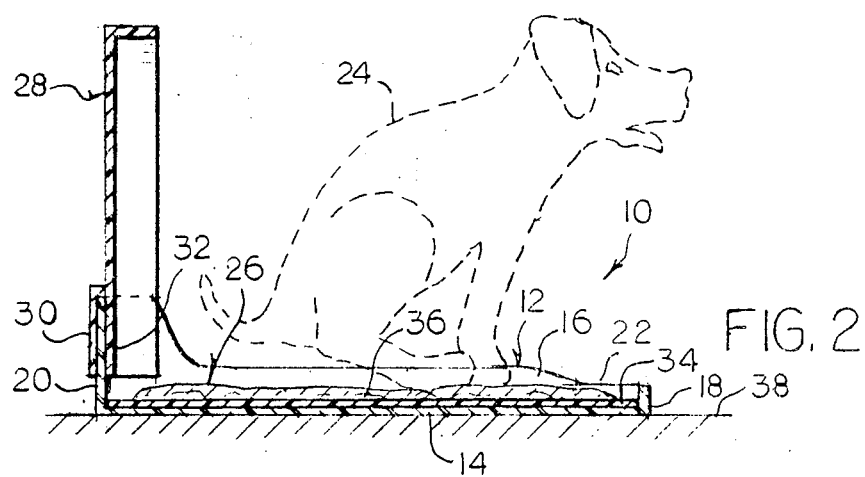
FIG. 2 is a cross sectional view taken along line 2—2 in FIG. 1 illustrating the instant invention with a dog in phantom thereon.
Figure 3:
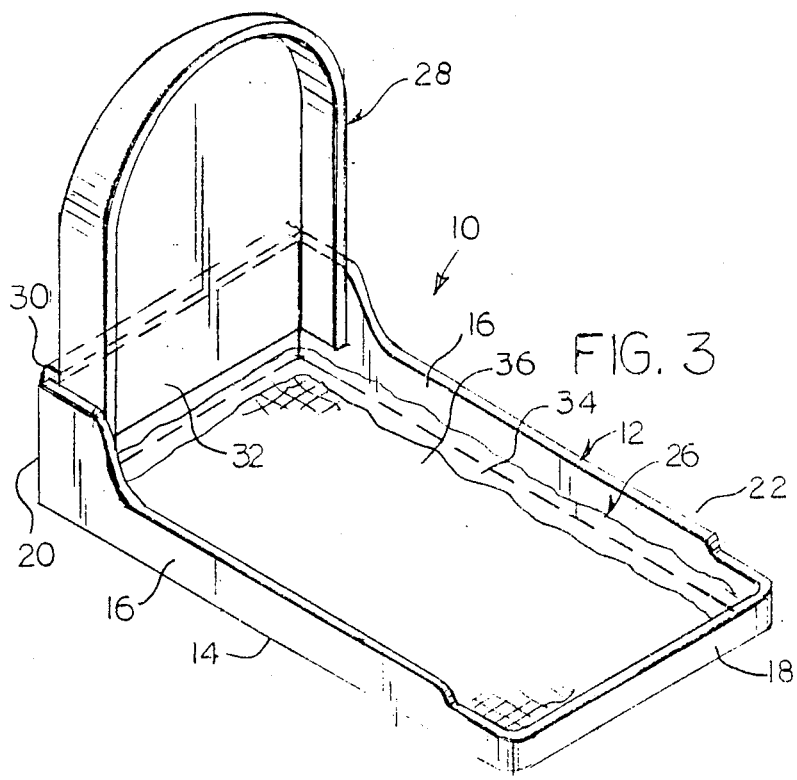
FIG. 3 is a perspective view thereof.

Turning now descriptively to the drawings, in which like reference characters denote like elements throughout the several views, FIGS. 1 through 3 illustrate a canine lavatory 10 consisting of a box-like base member 12 having a bottom wall 14, a pair of side walls 16, a front wall 18, a rear wall 20 and an open top 22 being of a size to receive a dog 24 thereon. A collector 26 is placed within the base member 12 for catching excrement from the dog 24 so that the excrement can be collected and removed from the base member 12 for disposal.

A deflector 28 is provided and is removably attached vertically to the rear wall 20 of the base member 12. If the dog 24 is a male and urinates the deflector 28 will direct the urine towards the collector 26 so that the urine can be collected and removed from the base member 12 for disposal. The deflector 28 further includes a clip member 30 affixed to its lower rear portion 32 thereof. The clip member 30 can engage with the rear wall 20 of the base member 12 and secure the deflector 28 thereto when the lower rear portion 32 of the deflector 28 is placed into the base member 12.

The collector 26 is a plastic sheet 34 sized to fit into the base member 12 and cover the bottom wall and an absorbent pad 36 centrally attached to the plastic sheet 34.

The base member 12 and deflector 28 can be fabricated out of rigid plastic or other durable materials and can be placed upon the floor 38 so that the dog 24 can enter the base member 12 and step onto the collector 26 to defecate and urinate. The collector 26 can then be folded up and disposed into a trash receptacle or the like.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A canine lavatory comprising:
   (a) a box-like base member having a bottom wall, a pair of side walls, a front wall, a rear wall and an open top, being of a size to receive a dog thereon;
   (b) a urine deflector comprising a panel with a flange outstanding from a periphery thereof together providing a continuous, generally concave imperforate, inner urine catchment surface;
   (c) means releasably to attach the urine deflector to a rearward wall part of the box-like base member with the panel extending vertically and the flange forwardly and lowermost edge portions of the deflector panel and flanges within the box-like base portion adjacent and in overlapping relation to the rear and side walls, respectively, so that if the dog is male and urinates, said deflector will direct the urine towards said excrement catching means so that the urine can be collected and removed from said base member for disposal; and,
   (d) means placed within said base member for catching excrement from the dog so that the excrement can be collected and removed from said base member for disposal.

2. A canine lavatory as recited in claim 1, wherein said deflector further includes a clip member affixed to a lower rear outer surface portion thereof so that said clip member can engage with said rear wall of said base member and secure said deflector thereto when the lower rear portion of said deflector is placed into said base member.

3. A canine lavatory as recited in claim 1, wherein said excrement catching means includes:
   (a) a plastic sheet sized to fit into said base member and cover said bottom wall; and
   (b) an absorbent pad centrally attached to said plastic sheet.

* * * * *